United States Patent
Huang et al.

(10) Patent No.: US 11,499,546 B2
(45) Date of Patent: Nov. 15, 2022

(54) PISTON PUMP COMPRISING AN ELECTRO-FLUIDIC LEAK DETECTION ELEMENT

(71) Applicant: Bio-Chem Fluidics, Inc., Boonton, NJ (US)

(72) Inventors: Henry X Huang, Edison, NJ (US); Ethan Matthew Gardner, Hoboken, NJ (US); Razvan Bulugioiu, Mountain Lakes, NJ (US); Michael Swern, Boonton, NJ (US); William A Easterbrook, Clinton, NJ (US); Sharad Harihar Joshi, Morristown, NJ (US)

(73) Assignee: BIO-CHEM FLUIDICS, INC., Boonton, NJ (US)

( * ) Notice: Subject to any disclaimer, the term of this patent is extended or adjusted under 35 U.S.C. 154(b) by 520 days.

(21) Appl. No.: 16/527,745

(22) Filed: Jul. 31, 2019

(65) Prior Publication Data

US 2020/0040890 A1 Feb. 6, 2020

Related U.S. Application Data

(60) Provisional application No. 62/712,749, filed on Jul. 31, 2018.

(51) Int. Cl.
*F04B 51/00* (2006.01)
*F04B 53/00* (2006.01)
*G01M 3/40* (2006.01)

(52) U.S. Cl.
CPC .............. *F04B 51/00* (2013.01); *F04B 53/00* (2013.01); *F04B 2201/0208* (2013.01); *F04B 2201/0803* (2013.01); *G01M 3/40* (2013.01)

(58) Field of Classification Search
CPC .. F04B 51/00; F04B 53/00; F04B 2201/0208; F04B 2201/0803; F04B 17/03;
(Continued)

(56) References Cited

U.S. PATENT DOCUMENTS 3,801,234 A * 4/1974 Love ...................... F04B 53/00
  417/454
3,914,752 A * 10/1975 Howard .................. F04B 49/10
  277/516
(Continued)

FOREIGN PATENT DOCUMENTS

WO 2018131560 A1 7/2018
WO 2019081941 A1 5/2019

OTHER PUBLICATIONS

Water Online "Pump Seal Fail Detection Methods" News, Feb. 8, 2001, 2 pgs.
(Continued)

*Primary Examiner* — Bryan M Lettman
(74) *Attorney, Agent, or Firm* — Dinsmore & Shohl LLP

(57) ABSTRACT

A reciprocating piston pump may include a fluid handling portion comprising a fluid inlet, a fluid outlet, and a pump chamber; a drive assembly portion comprising a piston drive assembly, a reciprocating piston, a drive assembly housing, and a drive assembly chamber; and an electro-fluidic leak detection element comprising a fluid sensing portion. The reciprocating piston of the drive assembly portion extends into the pump chamber of the fluid handling portion. The piston drive assembly operates to reciprocate the reciprocating piston within the pump chamber. The electro-fluidic leak detection element is mounted within the drive assembly portion. The electro-fluidic leak detection element is configured to generate a fluid leakage signal when fluid from the pump chamber enters the drive assembly chamber and contacts the fluid sensing portion of the electro-fluidic leak detection element. A plurality of reciprocating piston pumps may be incorporated into fluid handling systems.

25 Claims, 8 Drawing Sheets

(58) Field of Classification Search
CPC ...... F04B 17/04; F04B 17/042; F04B 35/045; F04B 35/04; F04B 39/04; F04B 39/041; F04B 49/10; G01M 3/40; G01M 3/00; G01M 3/02; G01M 3/04; G01M 3/16
USPC .................................. 73/40, 40.5 R, 46, 47
See application file for complete search history.

(56) References Cited

U.S. PATENT DOCUMENTS

| | | | |
|---|---|---|---|
| 5,040,579 A | | 8/1991 | Kawamura et al. |
| 5,203,202 A | | 4/1993 | Spencer |
| 5,476,004 A | * | 12/1995 | Kingsford ............. G01M 3/047 |
| | | | 73/40 |
| 5,661,406 A | | 8/1997 | Daily et al. |
| 5,793,150 A | | 8/1998 | Kober et al. |
| 6,175,310 B1 | * | 1/2001 | Gott ..................... G01M 3/165 |
| | | | 73/40 |
| 6,865,941 B2 | * | 3/2005 | Gibbs .................... G01M 3/18 |
| | | | 73/40 |
| 7,383,721 B2 | | 6/2008 | Parsons et al. |
| 8,281,645 B2 | | 10/2012 | Dryden |
| 2009/0211341 A1 | * | 8/2009 | Witt ..................... F04B 53/164 |
| | | | 417/474 |
| 2016/0298637 A1 | | 10/2016 | Rejniak et al. |
| 2018/0223880 A1 | | 8/2018 | Ooki |
| 2019/0107459 A1 | | 4/2019 | Lin et al. |
| 2019/0162625 A1 | | 5/2019 | Carr et al. |
| 2021/0156376 A1 | * | 5/2021 | Ogawa ................... F04B 53/10 |

OTHER PUBLICATIONS

Macromatic "Pump Seal Failure Relays" Single & Dual Channel, SFP Series Plug-In, 4 pgs.

* cited by examiner

PISTON PUMP COMPRISING AN ELECTRO-FLUIDIC LEAK DETECTION ELEMENT

CROSS-REFERENCE TO RELATED APPLICATIONS

This application claims the benefit of U.S. Provisional Application Ser. No. 62/712,749 (BCF 0010 MA), filed Jul. 31, 2018.

BACKGROUND

The present disclosure relates to reciprocating piston pumps and, more particularly, to leak detection reciprocating piston pumps and fluid handling systems incorporating the same.

BRIEF SUMMARY

According to the subject matter of the present disclosure, electro-fluidic leak detection elements are provided in the construction of reciprocating piston pumps to provide a means to sense the leakage of fluid from the pump chamber into the drive assembly housing of the piston pump.

In accordance with one embodiment of the present disclosure, a reciprocating piston pump comprises: a fluid handling portion comprising a fluid inlet, a fluid outlet, and a pump chamber; a drive assembly portion comprising a piston drive assembly, a reciprocating piston, a drive assembly housing, and a drive assembly chamber; a drive assembly housing insert mounted to an interior surface of the drive assembly housing; and an electro-fluidic leak detection element comprising a fluid sensing portion. The reciprocating piston of the drive assembly portion extends into the pump chamber of the fluid handling portion. The piston drive assembly operates to reciprocate the reciprocating piston within the pump chamber. The electro-fluidic leak detection element is mounted to an interior surface of the drive assembly housing insert. The electro-fluidic leak detection element is configured to generate a fluid leakage signal when fluid from the pump chamber enters the drive assembly chamber and contacts the fluid sensing portion of the electro-fluidic leak detection element.

In accordance with another embodiment of the present disclosure, a fluid handling system comprises a plurality of reciprocating piston pumps and a leak detecting computing hub in communication with the plurality of reciprocating piston pumps. Each reciprocating piston pump comprises: a fluid handling portion comprising a fluid inlet, a fluid outlet, and a pump chamber; a drive assembly portion comprising a piston drive assembly, a reciprocating piston, a drive assembly housing, and a drive assembly chamber; a drive assembly housing insert mounted to an interior surface of the drive assembly housing; and an electro-fluidic leak detection element comprising a fluid sensing portion. The reciprocating piston of the drive assembly portion extends into the pump chamber of the fluid handling portion. The piston drive assembly operates to reciprocate the reciprocating piston within the pump chamber. The electro-fluidic leak detection element is mounted to an interior surface of the drive assembly housing insert. The electro-fluidic leak detection element is configured to generate a fluid leakage signal when fluid from the pump chamber enters the drive assembly chamber and contacts the fluid sensing portion of the electro-fluidic leak detection element. The leak detecting computing hub is configured to identify individual pumps of the plurality of reciprocating piston pumps and process fluid leakage signals from each of the identified reciprocating piston pumps.

In accordance with another embodiment of the present disclosure, a reciprocating piston pump comprises: a fluid handling portion comprising a fluid inlet, a fluid outlet, and a pump chamber; a drive assembly portion comprising a piston drive assembly, a reciprocating piston, a drive assembly housing, and a drive assembly chamber; and an electro-fluidic leak detection element comprising a fluid sensing portion. The reciprocating piston of the drive assembly portion extends into the pump chamber of the fluid handling portion. The piston drive assembly operates to reciprocate the reciprocating piston within the pump chamber. The electro-fluidic leak detection element is mounted within the drive assembly portion. The electro-fluidic leak detection element is configured to generate a fluid leakage signal when fluid from the pump chamber enters the drive assembly chamber and contacts the fluid sensing portion of the electro-fluidic leak detection element.

Although the concepts of the present disclosure are described herein with primary reference to one specific type of reciprocating piston pump, it is contemplated that the concepts will enjoy applicability to a wide variety of piston pumps.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
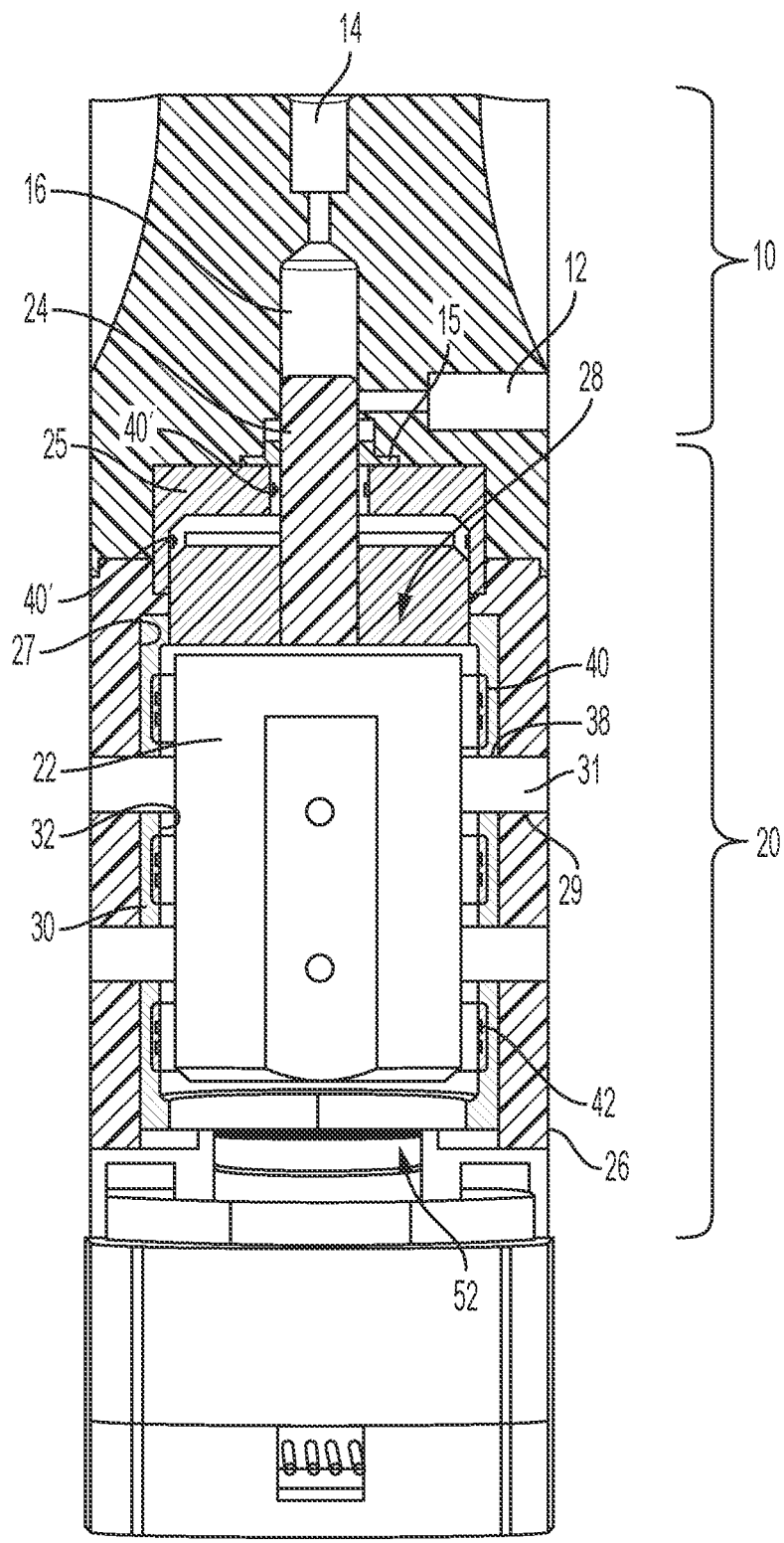
FIG. 1 is an illustration of a reciprocating piston pump comprising an electro-fluidic leak detection element according to one embodiment of the present disclosure.

Referring initially to FIG. 1, a reciprocating piston pump 100 according to the present disclosure is illustrated. The reciprocating piston pump 100 comprises a fluid handling portion 10, a drive assembly portion 20, a drive assembly housing insert 30, and an electro-fluidic leak detection element 40, which is shown only partially in FIG. 1 and is described in further detail herein with reference to FIGS. 2-4. The fluid handling portion 10 comprises a fluid inlet 12, a fluid outlet 14, and a pump chamber 16. The drive assembly portion 20 comprises a piston drive assembly 22, a reciprocating piston 24, a piston seal 15, a drive assembly bushing 25, a drive assembly housing 26, and a drive assembly chamber 28. The drive assembly housing insert 30 is mounted to an interior surface 27 of the drive assembly housing 26. The reciprocating piston pumps 100 contemplated herein may be configured to pump a variety of liquids, gasses, or multi-phase fluids and may embody a variety of configurations including, for example, the configuration illustrated in US PG Pub. No. 2018/0073502.

The electro-fluidic leak detection element 40 comprises a fluid sensing portion 42. The reciprocating piston 24 of the drive assembly portion 20 extends into the pump chamber 16 of the fluid handling portion 10. The piston drive assembly 22 operates to reciprocate the reciprocating piston 24 within the pump chamber 16. The electro-fluidic leak detection element 40 is mounted to an interior surface 32 of the drive assembly housing insert 30. The electro-fluidic leak detection element 40 is configured to generate a fluid leakage signal when fluid from the pump chamber 16 enters the drive assembly chamber 28 and contacts the fluid sensing portion 42 of the electro-fluidic leak detection element 40.

Figure 2:
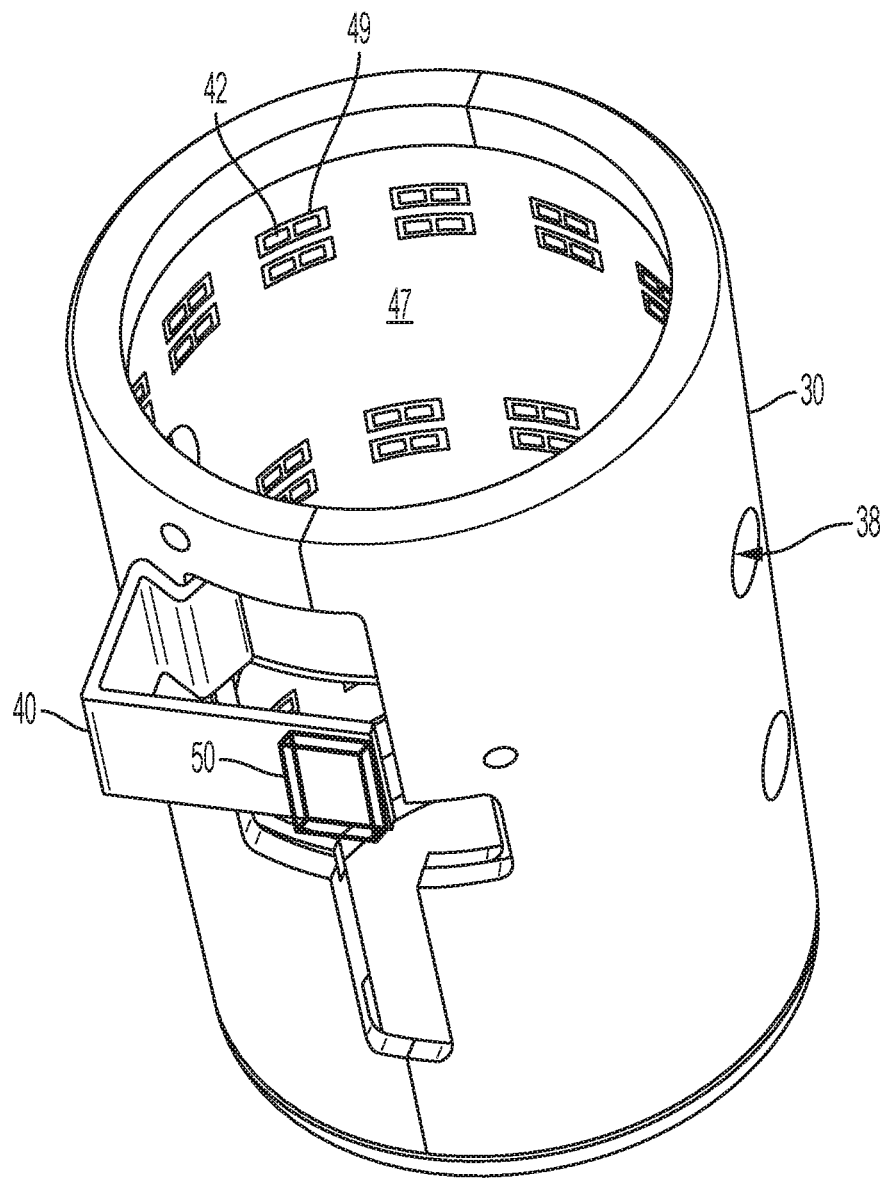
FIG. 2 is an illustration of a drive assembly housing insert and an electro-fluidic leak detection element according to one embodiment of the present disclosure.
Figure 3:
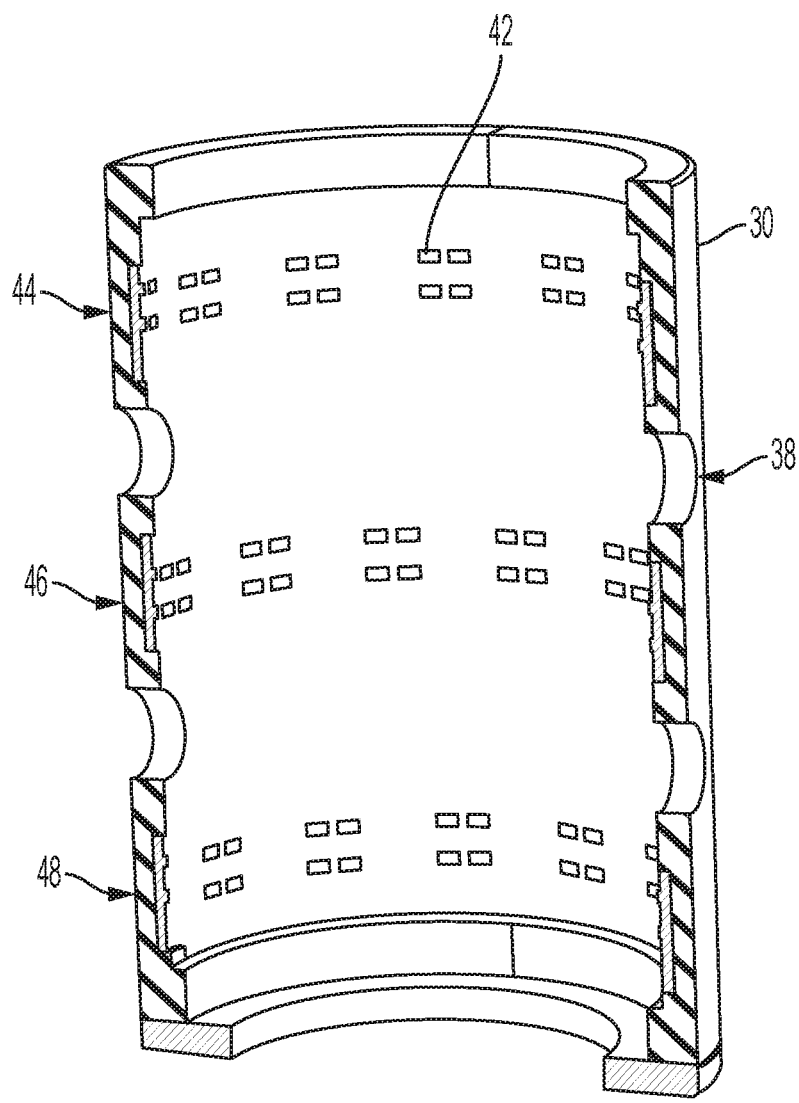
FIG. 3 is a cross-sectional illustration of a drive assembly housing insert and an electro-fluidic leak detection element according to one embodiment of the present disclosure.

FIGS. 2 and 3 illustrate embodiments of the drive assembly housing insert 30 in which the electro-fluidic leak detection element 40 comprises a plurality of fluid sensing portions 42. As is illustrated in FIGS. 1-4, the electro-fluidic leak detection element 40 may comprise an array of fluid sensing portions 42 defining a plurality of rows of fluid sensing portions 42. Regardless of the particular arrangement of the fluid sensing portions 42 chosen, the plurality of fluid sensing portions 42 may be positioned along the drive assembly housing insert 30 at progressively further distances from the fluid handling portion 10 of the reciprocating piston pump 100.

As shown in FIG. 3, the array of fluid sensing portions 42 may comprise a proximate row 44 of fluid sensing portions 42, an intermediate row 46 of fluid sensing portions 42, and a distal row 48 of fluid sensing portions 42, with each row being positioned along the drive assembly housing insert 30 at progressively further distances from the fluid handling portion 10 of the reciprocating piston pump 100.

Figure 4:
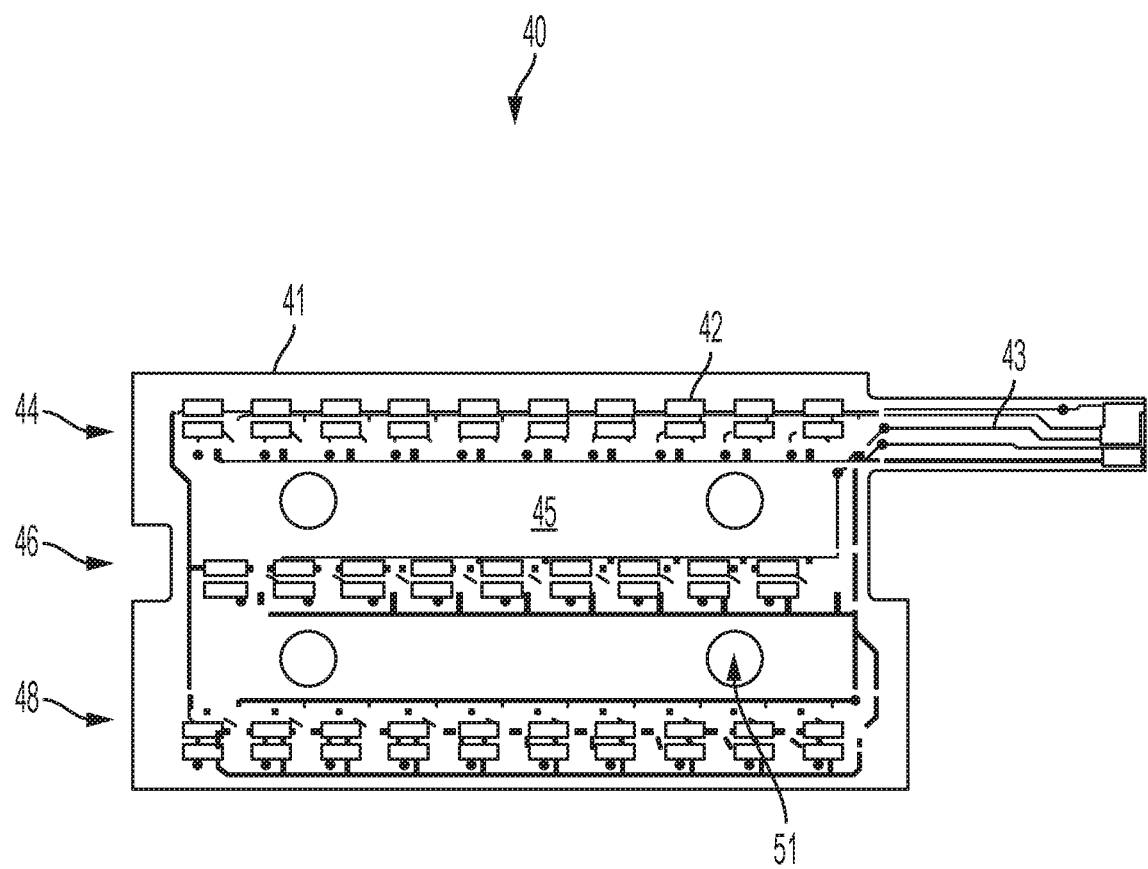
FIG. 4 is a plan view of an electro-fluidic leak detection element according to one embodiment of the present disclosure.

Referring to FIG. 4, the electro-fluidic leak detection element 40 may comprise a flexible printed circuit substrate 41 in which the fluid sensing portion 42 is secured to the flexible printed circuit substrate 41. The flexible printed circuit substrate 41, the fluid sensing portion 42, or both, may be mounted to the interior surface 32 of the drive assembly housing insert 30.

Referring further to FIG. 4, the electro-fluidic leak detection element 40 may comprise (a) a plurality of fluid sensing portions 42; (b) printed circuitry 43 that is electrically coupled to the fluid sensing portions 42 of the electro-fluidic leak detection element 40; and (c) a flexible printed circuit substrate 41. The flexible printed circuit substrate 41 may comprise a circuit side 45 and an exposed side 47 opposite the circuit side 45. The exposed side 47 of the flexible printed circuit 41 is not visible in FIG. 4, but is shown in FIG. 2. The fluid sensing portions 42 and the printed circuitry 43 are secured to the circuit side 45 of the flexible printed circuit substrate 41. The circuit side 45 of the flexible printed circuit substrate 41 faces the interior surface 32 of the drive assembly housing insert 30 and the exposed side 47 of the flexible printed circuit substrate 41 faces the drive assembly chamber 28.

The flexible printed circuit substrate 41 may further comprise a plurality of sensing windows 49 extending from the exposed side 47 of the flexible printed circuit substrate 41 to the circuit side 45 of the flexible printed circuit substrate 41. In some embodiments, the sensing windows 49 are aligned with corresponding ones of the fluid sensing portions 42 of the electro-fluidic leak detection element 40.

Regardless of which configuration of the electro-fluidic leak detection element 40 is chosen, the sensing portion 42 of the electro-fluidic leak detection element 40 may be coated with a polymer selected to be resistant to degradation when in contact with fluid from the pump chamber 16.

The sensing portion 42 of the electro-fluidic leak detection element 40 may comprise at least one anode/cathode pair. In other embodiments, the sensing portion 42 of the electro-fluidic leak detection element 40 comprises a conductive fluid sensor, a resistive fluid sensor, a capacitive fluid sensor, an optical fluid sensor, or combinations thereof.

As illustrated in FIG. 2, the reciprocating piston pump 100 may further comprise a leak detection module 50 coupled to the electro-fluidic leak detection element 40. The leak detection module 50 may be programmed to cooperate with the electro-fluidic leak detection element 40 to generate the fluid leakage signal.

Where the electro-fluidic leak detection element 40 comprises a plurality of fluid sensing portions 42, the leak detection module 50 may be programmed to cooperate with the fluid sensing portions 42 to generate a fluid leakage signal indicative of a degree of leakage in the drive assembly housing 26. The fluid leakage signal may comprise a single component with a magnitude indicative of a degree of leakage in the drive assembly housing 26. The fluid leakage signal may be manifested in a variety of ways. For example, the fluid leakage signal may be a digital representation of the degree of leakage within the drive assembly housing 26. In other embodiments, a more simple visual representation of the degree of leakage may manifest in the form of a display having, for example, a green indicator, a yellow indicator, and a red indicator, which indicate the degree of leakage within the drive assembly housing 26. The green indicator may signify that no fluid has entered the drive assembly housing 26, the yellow indicator may signify that fluid has contacted one or multiple rows of fluid sensing portions 42, and the red signal may indicate that the fluid has contacted most and/or all of the fluid sensing portions 42. An auditory sensor with varying pitches that indicates the degree of leakage within the drive assembly housing 26 may be used in addition to or instead of a visual representation. As such, in some embodiments, the fluid leakage signal comprises multiple components that are collectively indicative of a degree of leakage in the drive assembly housing 26.

The electro-fluidic leak detection element 40 may comprise a plurality of fluid sensing portions 42 positioned along the drive assembly housing insert 30 at progressively further distances from the fluid handling portion 10 of the reciprocating piston pump 100. In embodiments, each component of the fluid leakage signal corresponds to fluid sensing at one of the progressively further distances from the fluid handling portion 10 of the reciprocating piston pump 100.

In some embodiments, the electro-fluidic leak detection element 40 comprises an array of fluid sensing portions 42 defining at least two rows of fluid sensing portions 42. The rows of fluid sensing portions 42 may be positioned along the drive assembly housing insert 30 at progressively further distances from the fluid handling portion 10 of the reciprocating piston pump 100. Each component of the fluid leakage signal may correspond to fluid sensing in one of the rows of fluid sensing portions 42. In this manner, as fluid accumulates in the drive assembly housing 26, each row of fluid sensing portions 42 produces a signal component signifying the criticality of the leak within the drive assembly housing 26 as the sensing portions 42 in that particular row come into contact with the fluid.

Referring again to FIG. 1, it is contemplated that additional or alternative electro-fluidic leak detection elements may be provided in other parts of the drive assembly portion 20. For example, and not by way of limitation, it is contemplated that electro-fluidic leak detection elements may be provided in any location on the drive assembly side of the piston seal 15. In FIG. 1, additional or alternative leak detection elements 40' are illustrated on two different interior surfaces of the drive assembly bushing 25. In this manner, these alternative or additional electro-fluidic leak detection elements 40' may be configured to generate fluid leakage signals under different leak conditions, or potentially sooner than if the leak detection elements were only provided on the interior surface of the drive assembly housing insert 30. It is further contemplated that additional or alternative electro-fluidic leak detection elements may be provided on a motor 52, in the vicinity of the motor 52, or in any other location in the lower portion of the drive assembly portion 20.

The electro-fluidic leak detection element 40 may be configured to detect certain characteristics or properties of the fluid that has entered into the drive assembly housing 26. In embodiments, the reciprocating piston pump 100 further comprises the leak detection module 50 coupled to the electro-fluidic leak detection element 40 in which leak detection module 50 is programmed to cooperate with the electro-fluidic leak detection element 40 to generate the fluid leakage signal that is representative of one or more characteristics of the fluid. Fluid characteristics may include, but are not limited to, color, flow rate, particulate count, viscosity, turbidity, temperature, or combinations thereof.

Regardless of which configuration is chosen for the electro-fluidic leak detection element 40, an algorithm may be used to generate the fluid leakage signal once a leak is detected in the reciprocating piston pump 100. The following set of equations, for example, may be used to generate the fluid leakage signal:

$$V_i > 0.03 \text{ volts} \quad \text{(Equation 1)}$$

$$L = \left(1 - \frac{1}{R}\sum_{i=1}^{n} V_i\right)\% \quad \text{(Equation 2)}$$

Equation 1 is a leak detection threshold, where $V_i \geq 0.03$ volts to eliminate ambient noise generated by the electro-fluidic leak detection element 40. However, once a leak is detected by the electro-fluidic leak detection element 40, the voltage generated by the electro-fluidic leak detection element 40 may increase above the threshold. The threshold may be changed by one skilled in the art to any suitable voltage for detecting a leak in the reciprocating piston pump 100.

Equation 2 is a failure prediction algorithm, where "L" is the remaining lifetime of the reciprocating piston pump 100, "n" is the total number of fluid samples detected by the electro-fluidic leak detection element 40, and "R" is the sum of all $V_i$ (where $V_i > 0.03$ volts) over the lifetime of the reciprocating piston pump 100. The R value may vary based on the detected fluid's properties. For example, if R=25,000 for 10% NaOH solution, the algorithm will detect accumulated leaks caused by dry salt built up, which leads to degradation of the reciprocating piston pump 100. Here, the sum of the aggregated $V_i$ values corresponds to the accumulation of the leak. In other words, as the severity of the leak increases, more leakage will be detected by the electro-fluidic leak detection element 40, which will result in an increase of the $V_i$, value, thereby indicating failure of the reciprocating piston pump 100.

Figure 5:
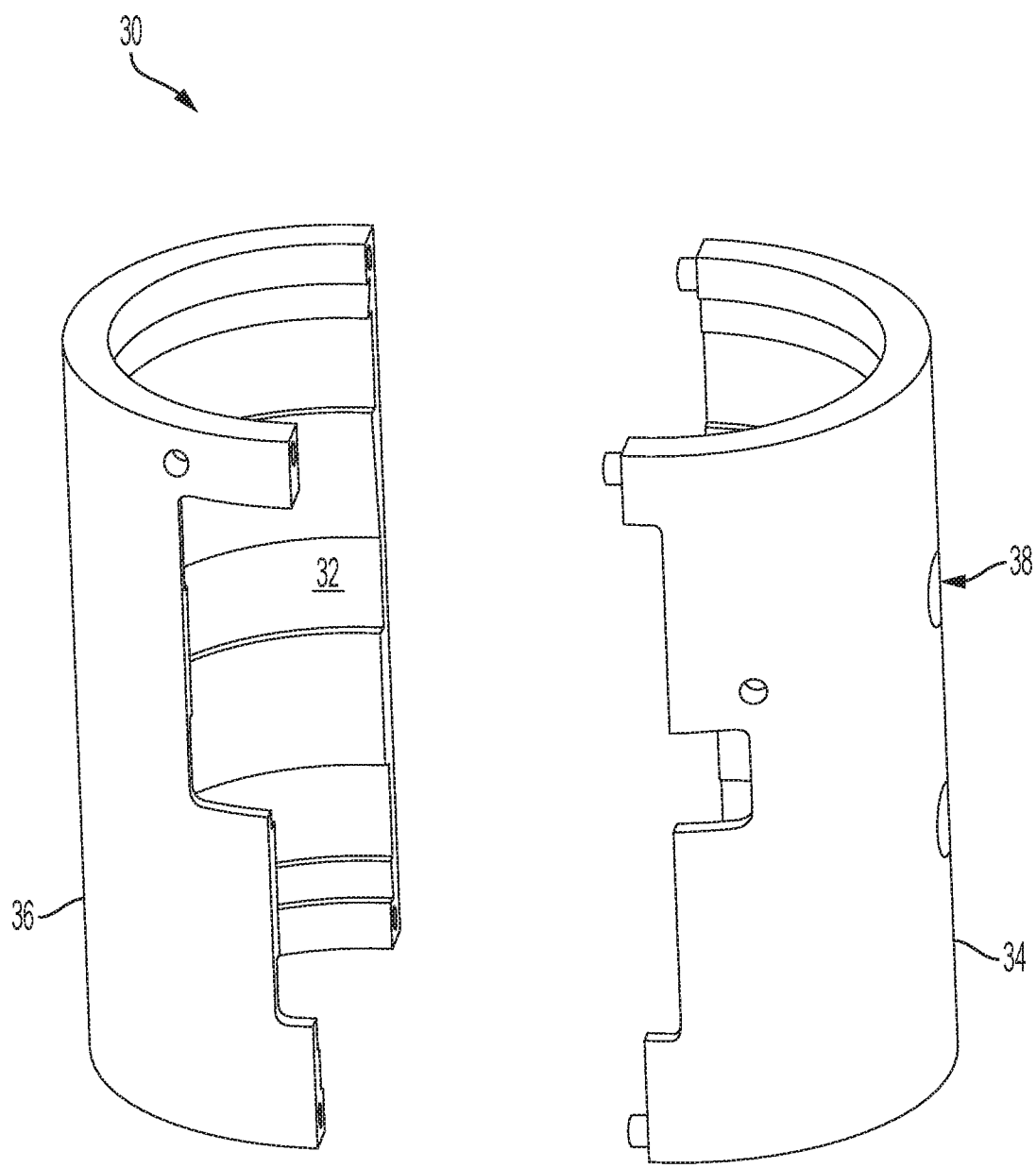
FIGS. 5-7 illustrate alternative drive assembly housing insert configurations according to the present disclosure.
Figure 6:
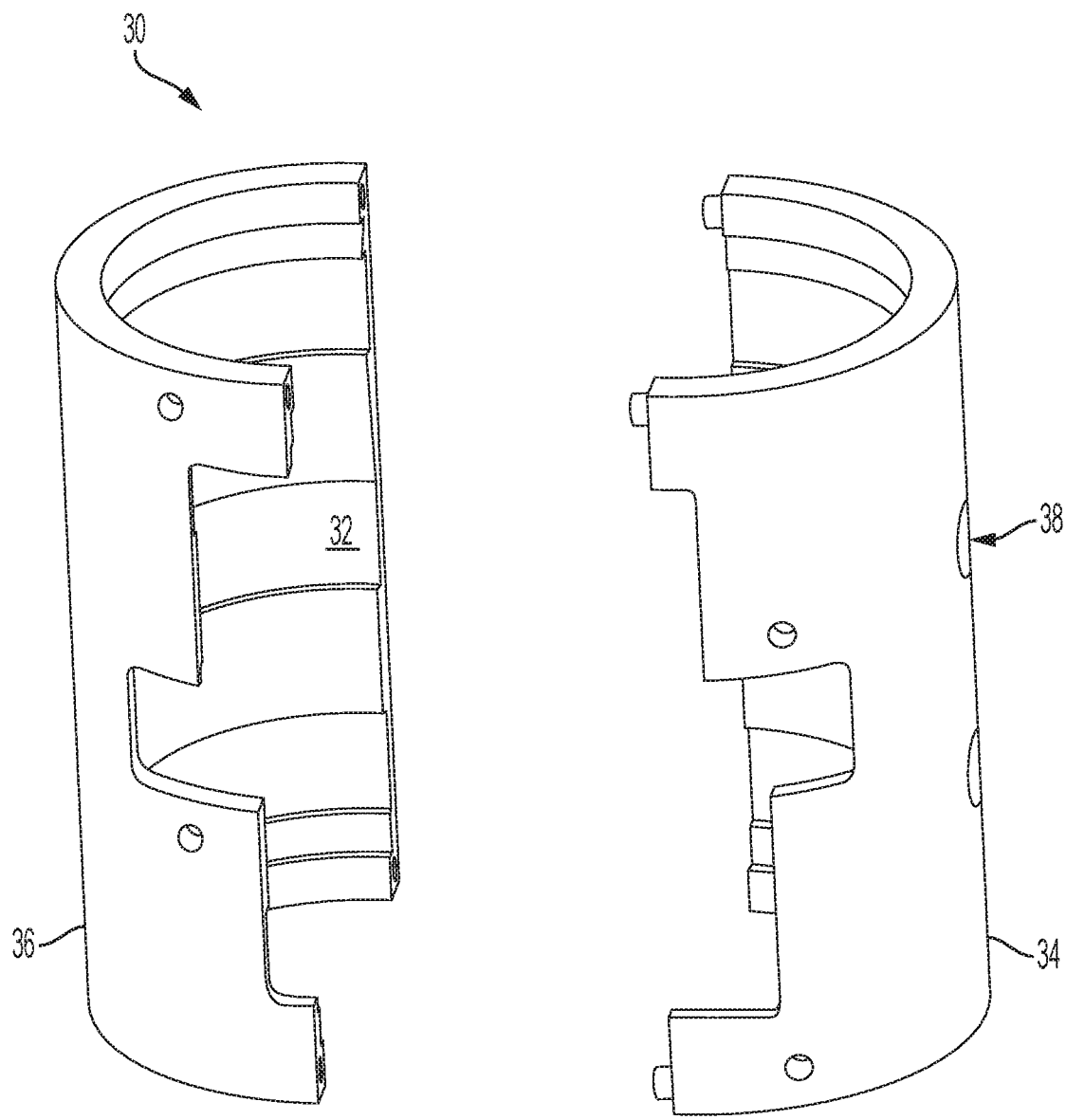
Figure 7:
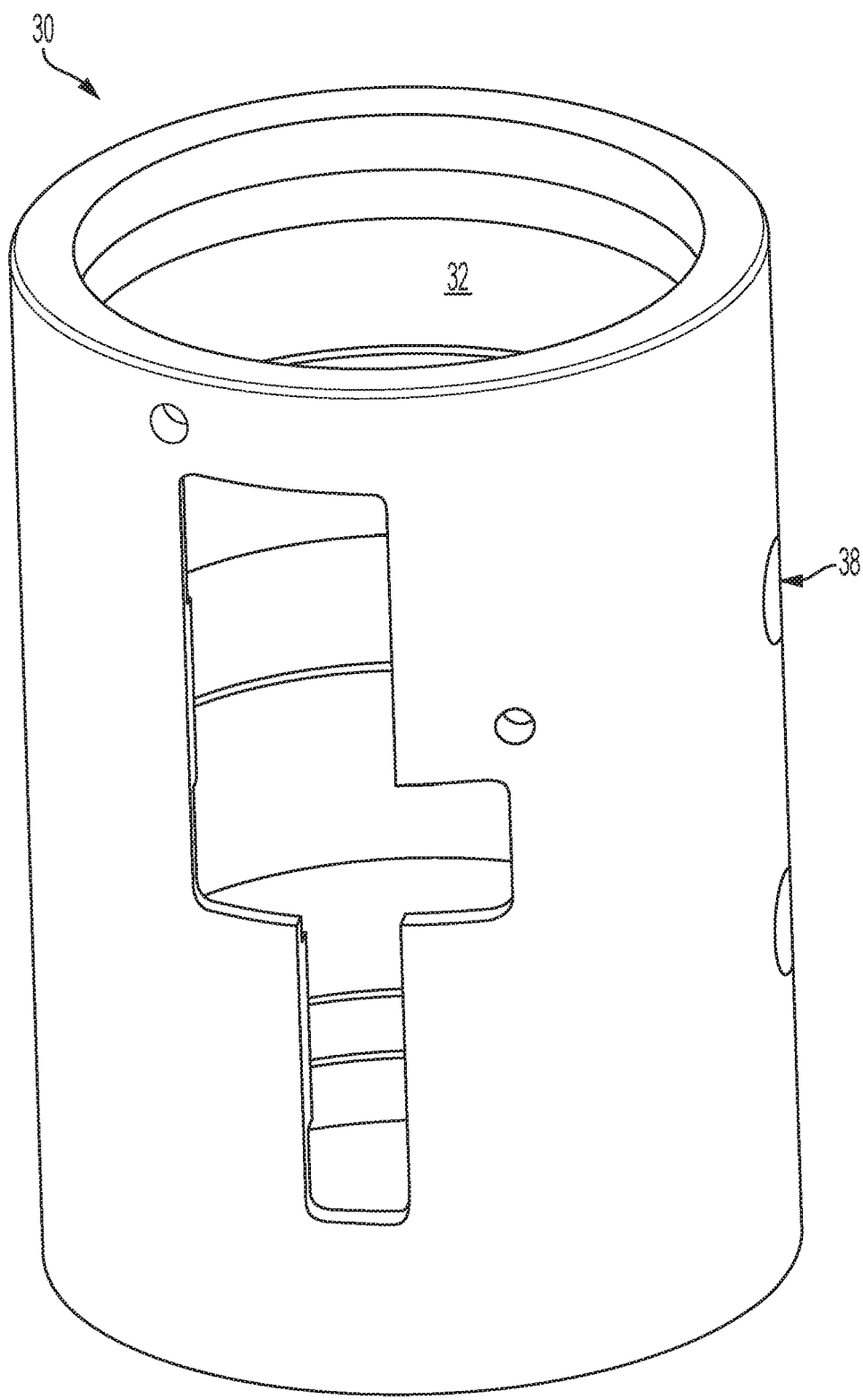

Referring now to FIGS. 5-7, which illustrate various drive assembly housing insert 30 configurations according to the present disclosure. In embodiments, such as those shown in FIGS. 5 and 6, the drive assembly housing insert 30 comprises a pair of mating half-cylinder portions 34 and 36. In other embodiments, such as the one shown in FIG. 7, the drive assembly housing insert 30 comprises unitary cylindrical body.

The drive assembly housing 26 may further comprise one or more stabilizing pin passages 29 aligned with stabilizing hardware 31, such as a pin, of the piston drive assembly 22. Similarly, the drive assembly housing insert 30 may comprise complementary stabilizing pin passages 38 that are arranged to align with the stabilizing pin passages 29 of the drive assembly housing 26 when the drive assembly housing insert 30 is mounted to the interior surface 27 of the drive assembly housing 26. The electro-fluidic leak detection element 40 may also comprise substrate passages 51 that are arranged to align with the stabilizing pin passages 38 of the drive assembly housing insert 30 when the electro-fluidic leak detection element 40 is mounted to the interior surface 32 of the drive assembly housing insert 30.

Figure 8:
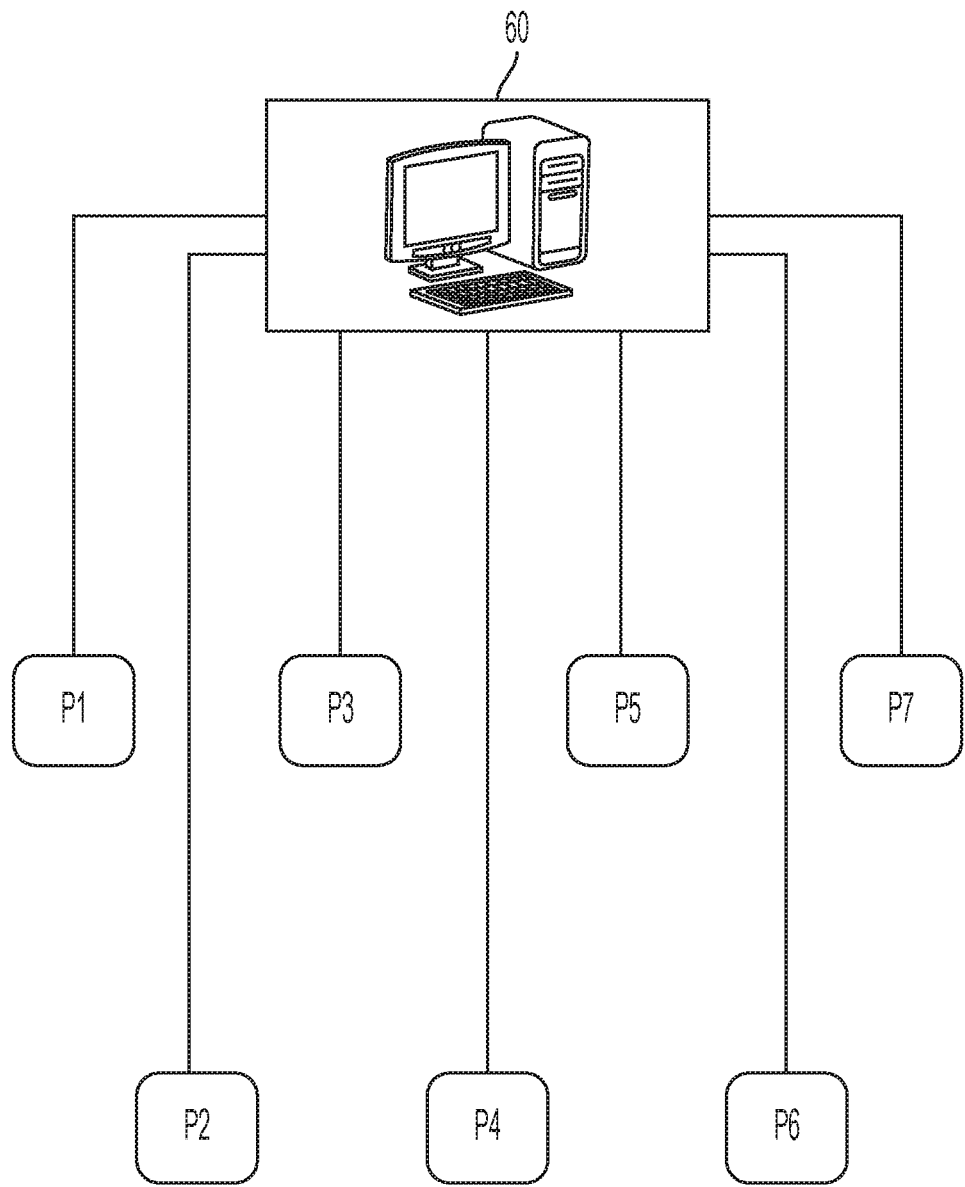
FIG. 8 is a schematic illustration of a fluid handling system according to various embodiments of the present disclosure.

Referring finally to FIG. 8, the present disclosure also encompasses a fluid handling system comprising a plurality of reciprocating piston pumps P1, P2, P3, etc., and a leak detecting computing hub 60 in communication with the plurality of reciprocating piston pumps P1, P2, P3, etc. The leak detecting computing hub 60 is configured to identify individual fittings of the plurality of reciprocating piston pumps P1, P2, P3, etc., and to process fluid leakage signals from each of the identified reciprocating piston pumps P1, P2, P3, etc. In this manner, the leak detecting computing hub 60 can be configured to build and store diagnostic data for each of the reciprocating piston pumps P1, P2, P3, etc., from the processed fluid leakage signals. It is noted that the leak detecting computing hub 60 may communicate with the reciprocating piston pumps P1, P2, P3, etc., in any conventional or yet-to-be developed manner including, for example, via a wired or wireless network, via a communications cloud, etc., and may comprise one or more microprocessors, and associated hardware, suitably programmed to receive and process signals from the reciprocating piston pumps P1, P2, P3, etc.

It is noted that recitations herein of "at least one" component, element, etc., or "one or more" components, elements, etc., should not be used to create an inference that the alternative use of the articles "a" or "an" should be limited to a single component, element, etc.

It is also noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is finally noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A reciprocating piston pump comprising:
a fluid handling portion comprising a fluid inlet, a fluid outlet, and a pump chamber;
a drive assembly portion comprising a piston drive assembly, a reciprocating piston, a drive assembly housing, and a drive assembly chamber;
a drive assembly housing insert mounted to an interior surface of the drive assembly housing; and
an electro-fluidic leak detection element comprising a fluid sensing portion, wherein
the reciprocating piston of the drive assembly portion extends into the pump chamber of the fluid handling portion,
the piston drive assembly operates to reciprocate the reciprocating piston within the pump chamber,
the electro-fluidic leak detection element is mounted to an interior surface of the drive assembly housing insert, and
the electro-fluidic leak detection element is configured to generate a fluid leakage signal when fluid from the pump chamber enters the drive assembly chamber and contacts the fluid sensing portion of the electro-fluidic leak detection element.

2. The reciprocating piston pump of claim 1, wherein the electro-fluidic leak detection element comprises a plurality of fluid sensing portions.

3. The reciprocating piston pump of claim 2, wherein the plurality of fluid sensing portions are positioned along the drive assembly housing insert at progressively further distances from the fluid handling portion of the reciprocating piston pump.

4. The reciprocating piston pump of claim 1, wherein:
the electro-fluidic leak detection element comprises an array of fluid sensing portions defining at least two rows of fluid sensing portions; and
the rows of fluid sensing portions are positioned along the drive assembly housing insert at progressively further distances from the fluid handling portion of the piston pump.

5. The reciprocating piston pump of claim 4, wherein the array of fluid sensing portions comprises a proximate row of fluid sensing elements, an intermediate row of fluid sensing elements, and a distal row of fluid sensing elements, each positioned along the drive assembly housing insert at progressively further distances from the fluid handling portion of the piston pump.

6. The reciprocating piston pump of claim 1, wherein:
the electro-fluidic leak detection element comprises a flexible printed circuit substrate; and
the fluid sensing portion is secured to the flexible printed circuit substrate.

7. The reciprocating piston pump of claim 6, wherein the flexible printed circuit substrate, the fluid sensing portion, or both, are mounted to the interior surface of the drive assembly housing insert.

8. The reciprocating piston pump of claim 1, wherein:
the electro-fluidic leak detection element comprises a plurality of fluid sensing portions;
the electro-fluidic leak detection element further comprises printed circuitry electrically coupled to the fluid sensing portion of the electro-fluidic leak detection element;
the electro-fluidic leak detection element comprises a flexible printed circuit substrate;
the flexible printed circuit substrate comprises a circuit side and an exposed side;
the fluid sensing portions and the printed circuitry are secured to the circuit side of the flexible printed circuit substrate;
the circuit side of the flexible printed circuit substrate faces the interior surface of the drive assembly housing insert;
the exposed side of the flexible printed circuit substrate faces the drive assembly chamber.

9. The reciprocating piston pump of claim 8, wherein:
the flexible printed circuit substrate further comprises a plurality of sensing windows extending from the exposed side of the flexible printed circuit substrate to the circuit side of the flexible printed circuit substrate; and
the sensing windows are aligned with corresponding ones of the fluid sensing portions of the electro-fluidic leak detection element.

10. The reciprocating piston pump of claim 1, wherein the sensing portion of the electro-fluidic leak detection element is coated with a polymer selected to be resistant to degradation when in contact with fluid from the pump chamber.

11. The reciprocating piston pump of claim 1, wherein the sensing portion of the electro-fluidic leak detection element comprises at least one anode/cathode pair.

12. The reciprocating piston pump of claim 1, wherein the sensing portion of the electro-fluidic leak detection element comprises a conductive fluid sensor, a resistive fluid sensor, a capacitive fluid sensor, an optical fluid sensor, or combinations thereof.

13. The reciprocating piston pump of claim 1, wherein:
the reciprocating piston pump further comprises a leak detection module coupled to the electro-fluidic leak detection element;
the leak detection module is programmed to cooperate with the electro-fluidic leak detection element to generate the fluid leakage signal and provide an indication of a remaining lifetime L of the reciprocating piston pump based at least in part on $$L = \left(1 - \frac{1}{R}\sum_{i=1}^{n} V_i\right)\%$$

where $V_i$ is a leak detection threshold voltage, R is the sum of all $V_i$ over the lifetime of the reciprocating piston pump, and n is the total number of fluid samples detected by the electro-fluidic leak detection element.

14. The reciprocating piston pump of claim 13, wherein:
the electro-fluidic leak detection element comprises a plurality of fluid sensing portions; and
the leak detection module is programmed to cooperate with the fluid sensing portions to generate a fluid leakage signal indicative of a degree of leakage in the drive assembly housing.

15. The reciprocating piston pump of claim 14, wherein the fluid leakage signal comprises a single component with a magnitude indicative of a degree of leakage in the drive assembly housing.

16. The reciprocating piston pump of claim 14, wherein the fluid leakage signal comprises multiple components that are collectively indicative of a degree of leakage in the drive assembly housing.

17. The reciprocating piston pump of claim 14, wherein:
the electro-fluidic leak detection element comprises a plurality of fluid sensing portions positioned along the drive assembly housing insert at progressively further distances from the fluid handling portion of the piston pump; and
each component of the fluid leakage signal corresponds to fluid sensing at one of the progressively further distances from the fluid handling portion of the piston pump.

18. The reciprocating piston pump of claim 14, wherein:
the electro-fluidic leak detection element comprises an array of fluid sensing portions defining at least two rows of fluid sensing portions;
the rows of fluid sensing portions are positioned along the drive assembly housing insert at progressively further distances from the fluid handling portion of the piston pump; and
each component of the fluid leakage signal corresponds to fluid sensing in one of the rows of fluid sensing portions.

19. The reciprocating piston pump of claim 1, wherein:
the reciprocating piston pump further comprises a leak detection module coupled to the electro-fluidic leak detection element;
the leak detection module is programmed to cooperate with the electro-fluidic leak detection element to generate the fluid leakage signal that is representative of color, flow rate, particulate count, viscosity, turbidity, temperature, or combinations thereof.

20. The reciprocating piston pump of claim 1, wherein the drive assembly housing insert comprises a pair of mating half-cylinder portions.

21. The reciprocating piston pump of claim 1, wherein:
the drive assembly housing comprises stabilizing pin passages aligned with stabilizing hardware of the piston drive assembly; and
the drive assembly housing insert comprises complementary stabilizing pin passages that are arranged to align with the stabilizing pin passages of the drive assembly housing when the drive assembly housing insert is mounted to the interior surface of the drive assembly housing.

22. A fluid handling system comprising a plurality of reciprocating piston pumps and a leak detecting computing hub in communication with the plurality of reciprocating piston pumps, wherein:
each reciprocating piston pump comprises a fluid handling portion comprising a fluid inlet, a fluid outlet, and a pump chamber; a drive assembly portion comprising a piston drive assembly, a reciprocating piston, a drive assembly housing, and a drive assembly chamber; a drive assembly housing insert mounted to an interior surface of the drive assembly housing; and an electro-fluidic leak detection element comprising a fluid sensing portion;
the reciprocating piston of the drive assembly portion extends into the pump chamber of the fluid handling portion;
the piston drive assembly operates to reciprocate the reciprocating piston within the pump chamber;
the electro-fluidic leak detection element is mounted to an interior surface of the drive assembly housing insert;
the electro-fluidic leak detection element is configured to generate a fluid leakage signal when fluid from the pump chamber enters the drive assembly chamber and contacts the fluid sensing portion of the electro-fluidic leak detection element; and
the leak detecting computing hub is configured to identify individual pumps of the plurality of reciprocating piston pumps and process fluid leakage signals from each of the identified reciprocating piston pumps.

23. The fluid handling system of claim 22, wherein the leak detecting computing hub is configured to build and store pump diagnostic data for each of the reciprocating piston pumps from the processed fluid leakage signals.

24. A reciprocating piston pump comprising:
a fluid handling portion comprising a fluid inlet, a fluid outlet, and a pump chamber;
a drive assembly portion comprising a piston drive assembly, a reciprocating piston, a drive assembly housing, and a drive assembly chamber; and
an electro-fluidic leak detection element comprising a fluid sensing portion, wherein
the reciprocating piston of the drive assembly portion extends into the pump chamber of the fluid handling portion,
the piston drive assembly operates to reciprocate the reciprocating piston within the pump chamber,
the electro-fluidic leak detection element is mounted within the drive assembly portion, and
the electro-fluidic leak detection element is configured to generate a fluid leakage signal when fluid from the pump chamber enters the drive assembly chamber and contacts the fluid sensing portion of the electro-fluidic leak detection element.

25. The reciprocating piston pump of claim 24, wherein:
the drive assembly portion further comprises a piston seal and a drive assembly bushing; and
the electro-fluidic leak detection element is secured to an interior surface of the drive assembly bushing.

* * * * *